(12) United States Patent
Liu et al.

(10) Patent No.: US 11,599,445 B2
(45) Date of Patent: Mar. 7, 2023

(54) WATCHER: PRECISE AND FULLY-AUTOMATIC ON-SITE FAILURE DIAGNOSIS

(71) Applicant: The Board of Regents of The University of Texas System, Austin, TX (US)

(72) Inventors: Tongping Liu, San Antonio, TX (US); Hongyu Liu, San Antonio, TX (US); Sam Albert Silvestro, San Antonio, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 763 days.

(21) Appl. No.: 16/442,042

(22) Filed: Jun. 14, 2019

(65) Prior Publication Data

US 2019/0384692 A1    Dec. 19, 2019

Related U.S. Application Data

(60) Provisional application No. 62/685,853, filed on Jun. 15, 2018.

(51) Int. Cl.
*G06F 11/36* (2006.01)
*G06F 9/38* (2018.01)
*G06F 9/30* (2018.01)

(52) U.S. Cl.
CPC ...... *G06F 11/3612* (2013.01); *G06F 9/30098* (2013.01); *G06F 9/3861* (2013.01)

(58) Field of Classification Search
CPC . G06F 9/30098; G06F 9/3861; G06F 11/3612
See application file for complete search history.

(56) References Cited

U.S. PATENT DOCUMENTS

| 5,050,168 A | * | 9/1991 | Paterson | G06F 11/3664 714/34 |
| 7,676,795 B2 | * | 3/2010 | Elnozahy | G06F 11/3636 714/21 |

(Continued)

OTHER PUBLICATIONS

Bhansali et al., "Framework for Instruction-level Tracing and Analysis of Program Executions", published by ACM, VEE'06 Jun. 14-16, 2006, Ottawa, Ontario, Canada, pp. 154-163 (Year: 2006).*

(Continued)

*Primary Examiner* — S. Sough
*Assistant Examiner* — Zheng Wei
(74) *Attorney, Agent, or Firm* — Smith, Gambrell & Russell LLP

(57) ABSTRACT

The techniques described herein may provide techniques for precise and fully-automatic on-site software failure diagnosis that overcomes issues of existing systems and general challenges of in-production software failure diagnosis. Embodiments of the present systems and methods may provide a tool capable of automatically pinpointing a fault propagation chain of program failures, with explicit symptoms. The combination of binary analysis, in-situ/identical replay, and debugging registers may be used together to simulate the debugging procedures of a programmer automatically. Overhead, privacy, transparency, convenience, and completeness challenges of in-production failure analysis are improved, making it suitable for deployment uses.

15 Claims, 11 Drawing Sheets

(56) References Cited

U.S. PATENT DOCUMENTS

| | | | |
|---|---|---|---|
| 8,719,791 B1* | 5/2014 | MacPherson | G06F 11/3636 |
| | | | 717/124 |
| 2007/0079292 A1* | 4/2007 | Chen | G06F 11/362 |
| | | | 717/127 |
| 2009/0089547 A1* | 4/2009 | Moyer | G06F 9/3861 |
| | | | 712/205 |
| 2018/0181480 A1* | 6/2018 | Dracea | G06F 11/364 |
| 2018/0253369 A1* | 9/2018 | O'Dowd | G06F 11/3636 |
| 2019/0121646 A1* | 4/2019 | Grant | G06F 9/30105 |

OTHER PUBLICATIONS

Kashikci et al., "Failure Sketching: A Technique for Automated Root Cause Diagnosis of in-Production Failures", published by ACM, SOSP'15, Oct. 4-7, 2015,Monterey,CA., pp. 344-360 (Year: 2015).*

* cited by examiner

Fig. 2

I1: mov -0x18(%rcx),%rbx

......

I2: xor %rbx, %rbx

......

I3: mov 0, %rbx

......

aa6: mov -0x18(%rbp),%rdx aaa: xor %fs:0x28,%rdx ab3: jne abd

| Application | Reference | Signal | Description | Type | One Level | | Multiple Levels | |
|---|---|---|---|---|---|---|---|---|
| | | | | | Replays (#) | Time (s) | Replays (#) | Time (s) |
| Aireplay-ng | CVE-2014-8322 | SIGABRT | Stack overflow | Sequential | 20 | 0.6 | 20 | 0.66 |
| Aubio | CVE-2017-17054 | SIGFPE | Divide by zero | Sequential | 3 | 0.27 | 13 | 2.14 |
| Cppcheck-148 | Bugbase [13] | SIGSEGV | Null pointer | Sequential | 4 | 0.52 | 4 | 0.52 |
| Cppcheck-152 | Bugbase [13] | SIGSEGV | Null pointer | Sequential | 5 | 0.57 | 5 | 0.55 |
| Crasher | Symbiosis [22] | SIGABRT | Assertion fails | Concurrency | 5 | 0.73 | 5 | 0.90 |
| Curl-721 | Bugbase [13] | SIGSEGV | Null pointer | Sequential | 4 | 0.32 | 4 | 0.34 |
| Exiv2-1 | CVE-2018-9303 | SIGABRT | Assertion fails | Sequential | 4 | 0.62 | 11 | 1.17 |
| Exiv2-2 | CVE-2018-9304 | SIGFPE | Divide-by-zero | Sequential | 3 | 0.38 | 3 | 0.35 |
| HTTrack | Issue #20247 | SIGSEGV | Null pointer | Concurrency | 3 | 6.17 | 3 | 6.17 |
| Jasper | CVE-2016-9397 | SIGABRT | Assertion fails | Sequential | 21 | 3.61 | 60 | 7.09 |
| Libming | CVE-2018-7874 | SIGSEGV | Invalid address | Sequential | 4 | 0.21 | 74 | 0.49 |
| Libtiff | CVE-2017-7595 | SIGFPE | Divide-by-zero | Sequential | 4 | 0.31 | 18 | 0.96 |
| Memcached | CVE-2011-4971 | SIGSEGV | Invalid address | Sequential | 50 | 3.52 | 89 | 4.84 |
| Openjpeg | CVE-2016-7445 | SIGSEGV | Null pointer | Sequential | 7 | 0.43 | 11 | 1.36 |
| Pbzip2 | Bugbase [13] | SIGSEGV | Null pointer | Concurrency | 4 | 4.55 | 4 | 4.58 |
| Pfscan | Symbiosis [22] | SIGABRT | Assertion fails | Concurrency | 7 | 0.78 | 11 | 1.01 |
| Polymorph | Bugbench [20] Issue #33 | SIGABRT | Stack overflow | Sequential | 12 | 0.63 | 16 | 0.73 |
| Sam2p-1 | CVE-2017-16663 | SIGFPE | Divide by zero | Sequential | 9 | 8.23 | 13 | 10.46 |
| Sam2p-2 | Ticket #cfa2c908f2 | SIGSEGV | Null pointer | Sequential | 4 | 0.28 | 6 | 0.29 |
| Sqlite | Symbiosis [22] | SIGABRT | Assertion fails | Sequential | 4 | 0.74 | 4 | 0.75 |
| Stringbuffer | CVE-2017-5205 | SIGABRT | Check fails, abort | Concurrency | 8 | 1 | 38 | 3.34 |
| Tcpdump | Issue #1818 | SIGSEGV | Invalid address | Sequential | 3 | 0.28 | 4 | 0.29 |
| Transmission | | SIGABRT | Assertion fails | Concurrency | 5 | 6.06 | 5 | 6.17 |

Fig. 6

```
static void process_bin_update(conn *c) {
......
L1: vlen=c->binary_header.request.bodylen-
(nkey+c->binary_header.request.extlen);
......
L2: c->rlbytes = vlen;
......
}
static void drive_machine(conn *c) {
......
L3: int tocopy = c->rbytes > c->rlbytes ?
c->rlbytes : c->rbytes;
......
L4: memmove(c->ritem, c->rcurr, tocopy);
......
}
```

Fig. 7

```
int pqueue_put(PQUEUE *qp, void *item) {
......
L1: lock(&qp->mtx);
......
L2: qp->occupied++;
L3: unlock(&qp->mtx);
......
}
int pqueue_get(PQUEUE *qp, void **item) {
......
L4: lock(&qp->mtx);
L5: if (qp->occupied > 0) {
L6:    unlock(&qp->mtx);
       ......
L7:    lock(&qp->mtx);
L8:    assert(qp->occupied > 0);
       ......
L9:    qp->occupied = qp->occupied - 1;
       unlock(&qp->mtx);
       }
}
```

Fig. 8

```
int tcp_test(char* ip_str, const short port){
L1:     unsigned char packet[1024];
        ......
        while(1) {
        ......
L2:         len = getFromHeader();
L3:         caplen = read(sock, packet, len);
        ......
        }
}
```

Fig. 9

| Application | Total Information | | | Epoch Info | |
|---|---|---|---|---|---|
| | Epochs | Syscalls | Syncs. | Length (s) | Memory (MB) |
| blackscholes | 1 | 5 | 38 | 59.50 | <1 |
| bodytrack | 1 | 13602 | 2176k | 35.00 | 84 |
| canneal | 1 | 12499 | 207 | 29.88 | <1 |
| dedup | 1 | 806k | 1004k | 12.40 | 88 |
| ferret | 1 | 527 | 3740 | 4.66 | <1 |
| fluidanimate | 8 | 4420 | 1723345k | 6.32 | 8218 |
| raytrace | 1 | 53588 | 12793 | 48.09 | 4 |
| streamcluster | 1 | 3 | 2991k | 58.99 | 114 |
| aget | 35 | 262k | 131k | 0.16 | <1 |
| apache* | - | 190k | 10002 | - | 2 |
| memcached* | - | 26448 | 52654 | - | 1 |
| pbzip2 | 1 | 352 | 2448 | 1.38 | <1 |
| pfscan | 1 | 22 | 81 | 1.77 | <1 |
| sqlite | 9 | 11517k | 10609k | 5.96 | 123 |

WATCHER: PRECISE AND FULLY-AUTOMATIC ON-SITE FAILURE DIAGNOSIS

CROSS-REFERENCE TO RELATED APPLICATIONS

This application claims the benefit of U.S. Provisional Application No. 62/685,853, filed Jun. 15, 2018, the contents of which are hereby incorporated by reference herein in their entirety.

BACKGROUND OF THE INVENTION

The present invention relates to precise and fully-automatic on-site software failure diagnosis that overcomes issues of existing systems and general challenges of in-production software failure diagnosis.

In-production software failure diagnosis remains a challenging task even after decades of research. Failure diagnosis, with the ultimate goal of identifying statements and sequences of memory accesses leading to a failure, may consume substantial amounts of overall development costs and developers' time. It can be extremely challenging to diagnose in-production software failures for multiple reasons. For example, some failures are not always reproducible. Normal users of in-production software (such as MICROSOFT OFFICE®) are typically not experts, and may not have the ability or willingness to perform failure diagnosis, especially when existing tools require either nontrivial manual effort or expertise to operate. Programmers generally cannot access the in-production environment, due to business or privacy concerns.

As a result of these challenges, current state-of-practice systems mainly focus on post-mortem analysis of crash dumps collected from users. Such systems may pinpoint call stacks or even root causes of partial sequential errors by employing offline core dump and binary analysis. However, they share some common issues, since core dumps only include the states at the time of failure, but lack state changes prior to failures. Therefore, they cannot diagnose concurrency failures, due to the lack of interleaved accesses from multiple threads. Further, they cannot diagnose a large portion of sequential failures due to incomplete states and information-destroying instructions. Finally, users may still have privacy concerns with regard to sharing core dumps with software vendors.

To overcome some of these issues, some conventional approaches may record partial execution information to assist offline failure analysis. Likewise, some conventional approaches may record control flow tracing and coarse timing information, relying on modern hardware support. After obtaining the trace data, such approaches may performs inter-procedural static analysis, only on executed code, and employ the timing information to perform partial flow sensitive analysis. However, such conventional approaches still have issues such as requiring multiple successful and failed traces to statistically infer the control flow differences which lead to concurrency failures. Such conventional approaches are not designed to diagnose sequential failures and may not be able to diagnose highly concurrent failures, failures caused by multiple variables, or failures where failing instructions are not inside the bug pattern, such as software aborts/assertions, and nonstop failures.

Other conventional approaches may employ record-and-replay (RnR) systems to replay failures offline in an in-house setting. However, there are multiple issues with such systems, for example: offline replay also requires the same runtime environment, which may not be accessible due to privacy reasons, such as private inputs or all related third-party libraries. Many existing record-and-replay systems may impose prohibitively high performance overhead.

Accordingly, a need arises for techniques that provide precise and fully-automatic on-site software failure diagnosis that overcomes issues of existing systems and general challenges of in-production software failure diagnosis.

SUMMARY OF THE INVENTION

The techniques described herein may provide techniques for precise and fully-automatic on-site software failure diagnosis that overcomes issues of existing systems and general challenges of in-production software failure diagnosis.

Embodiments of the present systems and methods may provide a tool capable of automatically pinpointing a fault propagation chain of program failures, with explicit symptoms, such as crashes or program hangs. The combination of binary analysis, in-situ/identical record and replay, and debugging registers can be used together to automatically simulate the debugging procedures of a programmer automatically. The challenges of overhead, privacy, transparency, convenience, and completeness in in-production failure analysis may be overcome, making it suitable for deployment uses.

For example, in an embodiment, a method may comprise recording information during the original execution of software code, when a failure is detected in the execution of the software code, performing failure analysis using the recorded information up re-execution of software code, and generating a failure report indicating a root cause of the fault detected in the execution of the software code.

In embodiments, the failure analysis may comprise intercepting a failure signal indicating a failure detected in the execution of the software code, identifying a failing call stack and the instruction pointer to determine a fault location in the software code of the failure detected in the execution of the software code, if necessary, identifying all possible branches of execution leading to the determined fault location in the software code of the failure detected in the execution of the software code, and placing breakpoints on corresponding jump instructions to determine a failing branch, determining the memory address fault values are loaded from, tracing data flow on that memory address by debugging registers, determining which accesses occurred before other accesses using happens-before analysis, and extracting important information for generating the failure report. The method may further comprise after determining the failing branch, determining a failing instruction and corresponding registers. Determining the failing instruction and register may comprise determining the failing register using the failing instruction pointed by the instruction pointer, setting breakpoints to determine a last assignment to the failing register before the failure, computing a failing address based on a value in the failing register upon the last assignment, installing a watchpoint on the failing address, and tracing potential instructions that attempt to access the failing address using the watchpoint, a mechanism that is widely used in the debugging environment. The method may further comprise after determining which accesses occurred before other accesses, pruning accesses that cannot be part of the root cause of the failure in the execution of the software code.

In an embodiment, a system may comprise: a processor, memory accessible by the processor and adapted to store program instructions, and program instructions stored in the memory and executable by the processor to perform: recording information relating to execution of software code, when a failure is detected in the execution of the software code, performing failure analysis using the recorded information relating to the execution of software code, and generating a failure report indicating a cause of the fault detected in the execution of the software code.

In an embodiment, a computer program product may comprise a non-transitory computer readable storage having program instructions embodied therewith, the program instructions executable by a computer system, to cause the computer system to perform a method comprising: recording, at the computer system, information relating to execution of software code, when a failure is detected in the execution of the software code, performing, at the computer system, failure analysis using the recorded information relating to the execution of software code, and generating, at the computer system, a failure report indicating a cause of the fault detected in the execution of the software code.

BRIEF DESCRIPTION OF THE DRAWINGS

So that the manner in which the above recited features of the present invention can be understood in detail, a more particular description of the invention, briefly summarized above, may be referenced to embodiments, some of which are illustrated in the appended drawings. It is to be noted, however, that the appended drawings illustrate only typical embodiments of this invention and the invention may admit to other equally effective embodiments.

FIG. 2 illustrates examples of methods of setting breakpoints.

FIG. 3 illustrates an example workflow of a real assertion.

FIG. 5 illustrates exemplary results of an experiment to determine the effectiveness of embodiments of the present systems and methods.

FIG. 6 illustrates an example of the Memcached bug.

FIG. 7 illustrates an example of an assertion failure.

FIG. 8 illustrates an example of a stack buffer overflow bug.

FIG. 9 illustrates an example of data that was collected on the number of epochs, synchronizations, and system calls.

Other features of the present embodiments will be apparent from the Detailed Description that follows.

DETAILED DESCRIPTION OF THE EMBODIMENTS

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention. Electrical, mechanical, logical, and structural changes may be made to the embodiments without departing from the spirit and scope of the present teachings. The following detailed description is therefore not to be taken in a limiting sense, and the scope of the present disclosure is defined by the appended claims and their equivalents.

The techniques described herein may provide techniques for precise and fully-automatic on-site software failure diagnosis that overcomes issues of existing systems and general challenges of in-production software failure diagnosis.

Embodiments of the present systems and methods may use the combination of binary-based analysis and identical replay to perform precise on-site failure diagnosis. Embodiments of the present systems and methods may combine static analysis and dynamic analysis into the same system. Binary analysis (for example, based on XED2) may be used to precisely identify all possible branches or instructions. Then an identical replay or re-execution (for example, based on iReplayer) may be performed to confirm the target one. Identical re-execution may supply the complete and accurate execution information needed for analysis, avoiding the issues that may arise due to incomplete information. Embodiments of the present systems and methods may not require pointer aliasing analysis, overcoming the imprecision of static analysis, but relying on precise information of register assignments that can be collected using a typical binary analysis. Given that an application may be identically reproduced, the root cause of a failure can be diagnosed due to the precise properties of the present techniques.

Embodiments of the present systems and methods may further use multiple practical mechanisms to simulate programmers' presence at user sites, to watch the execution of programs, perform failure diagnosis, and report the fault propagation chain in the end.

Figure 1:
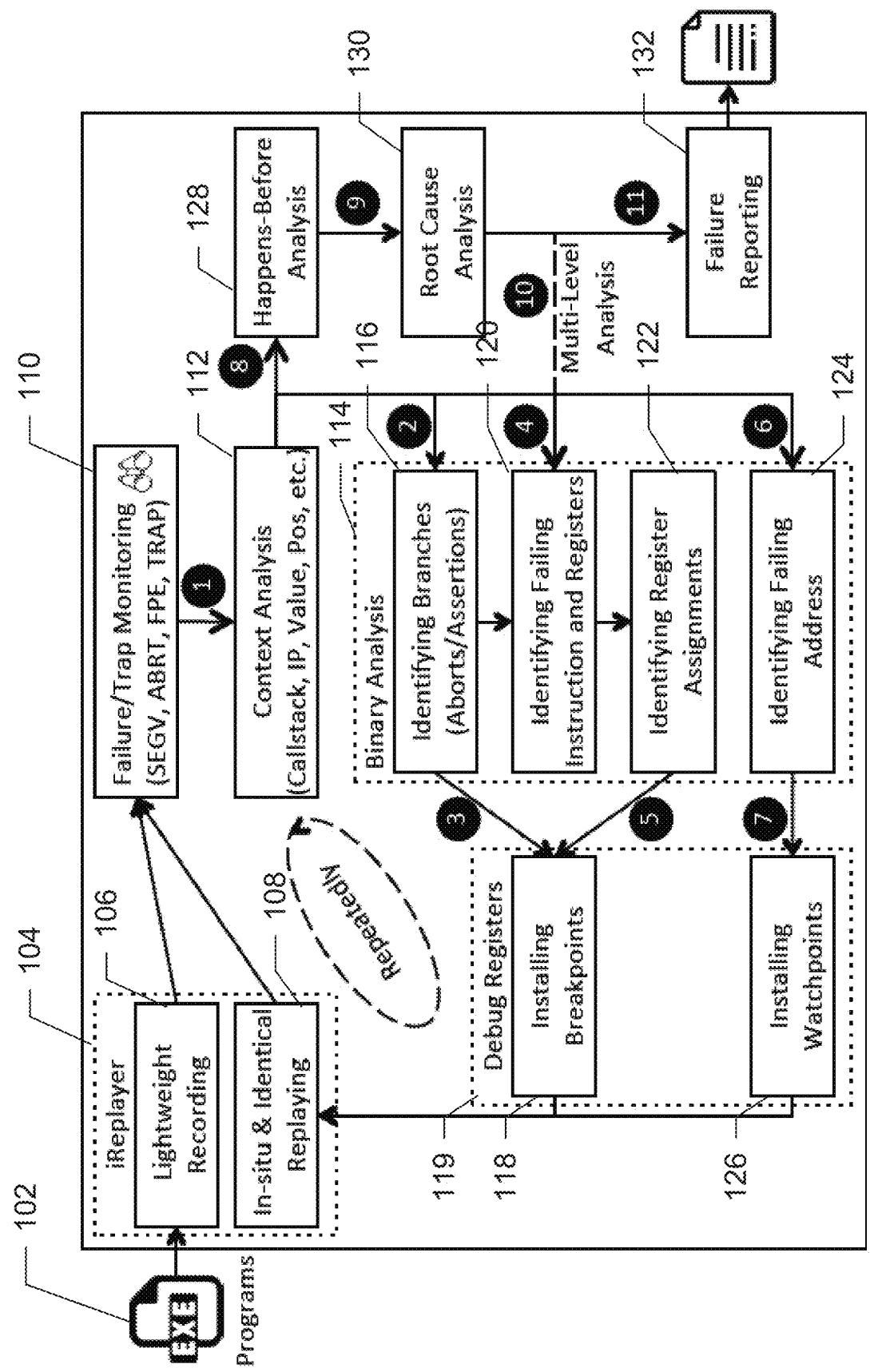
FIG. 1 is an exemplary block diagram and data flow diagram of embodiments of the present systems and methods.

An exemplary block diagram and data flow diagram of embodiments of the present systems and methods is shown in FIG. 1. In the example shown in FIG. 1, one or more programs 102 which are under analysis may execute. A recording and replay module 104, such as iReplayer, may record 106 information relating to the execution of programs 102. For example, iReplayer may perform lightweight recording that does not create significant overhead for the execution of programs 102. Recording and replay mechanism 104 may further include a replay function 108 that may provide in-situ and identical replay of the execution of programs 102.

In embodiments, if, for example, iReplayer is used, it may be extended with a "Failure Monitoring" module 110 that intercepts different failure signals, for example, SIGSEGV, SIGABRT, and SIGFPE. To detect program hangs, an additional monitor thread may keep monitoring the position of each thread, which indicates a potential hang problem if there are no state changes for a particular thread. If programs 102 do not have explicit failures, the present techniques may impose no additional overhead on top of iReplayer, which may only impose, for example, 3% performance overhead for common cases.

Upon failures, the present techniques may invoke failure analysis on demand by handling failure signals, "Context Analysis" 112 may be performed, for example, inside the signal handler (step 1), in order to identify the failing call stack and instruction pointer (IP). Depending upon the instruction information and signal type: for SIGABRT signals caused by aborts or assertions, binary analysis 114 may be employed to identify all possible branches 116 (step 2), to place breakpoints 118 on the corresponding jump instructions (step 3), for example in debug registers 119, and to determine the failing branch during replays, where the failing branch is the last branch executed before the failure. After determining the failing branch, binary analysis may be employed to determine the failing instruction and registers 120 (step 4). Processing may then proceed similarly to the processing of other signals.

For other types of signals, embodiments may employ the failing instruction (pointed to by the instruction pointer) to determine the failing registers 120 inside (step 4). In many situations, there are multiple instructions that may operate on the failing register. Therefore, breakpoints (using debugging registers) may again be employed to determine the corresponding assignment 122 (step 5), which is the last assignment before the failure. After identifying each register assignment, the failing address 124 may be computed (step 6) based on the register value, then watchpoints 126 may be installed on the failing address (step 7), for example in debug registers 119. Accordingly, potential instructions (or statements) that attempt to read/write on the corresponding address may be traced.

After collecting information about one or more accesses (with value and position information) from various threads, happens-before analysis 128 may be performed on the access information (step 8). Unnecessary accesses that are impossible to be a part of the root cause may be pruned, then root cause analysis 130 (step 9) may be performed to extract important information for reporting. The processing may be configured to proceed with multi-level analysis (step 10), or to issue a report 132 immediately (step 11).

Embodiments of the present systems and methods may employ two types of debug registers 119—breakpoints 118 and watchpoints 126—to perform operations on behalf of programmers, and may perform precise analysis by simulating programmers who debug the failure using debuggers, without resorting to any additional tools.

Embodiments of the present systems and methods may deal with multiple general challenges of diagnosing in-production software failures. For example, the present techniques may deal with the challenge of excessive overhead by only invoking failure analysis on demand, which imposes the recording overhead inherited from iReplayer (3% on average) for common cases in which programs do not suffer failures. Embodiments of the present systems and methods may deal with the challenge of privacy issues that may arise, for example, due to reliance on core dumps, execution records, control flow information, or both the same execution environment and execution record, while business and privacy concerns may prevent users from sharing these with programmers. Embodiments of the present systems and methods may conduct on-site failure analysis and only report the statements leading to failures, which does not leak any sensitive information to programmers. Embodiments of the present systems and methods may deal with the challenge of transparency arising from, for example, post-mortem core dump analysis, or statistical failure analysis, which may still require some degree of expertise and manual effort. Embodiments of the present systems and methods may require little or no effort from users, who only need to wait a short amount of time for performing its precise and fully-automatic failure diagnosis. Embodiments of the present systems and methods may deal with the challenge of convenience by implementing a drop-in library that requires no special hardware support, no custom OS support, and no re-compilation or changes of applications.

Scope of Program Failures. Embodiments of the present systems and methods may diagnose a range of serious program failures with explicit symptoms, which raise certain signals to assist detection. These failures may include, but are not limited to, sequential and concurrency failures such as segmentation faults, assertion failures, aborts, and divide-by-zero errors. These failures also include program hangs caused by deadlocks, lost signals, etc. Failing instructions are not required to be a part of the bug pattern, where the present techniques may precisely diagnose program aborts and assertion failures. Embodiments of the present systems and methods may also diagnose software failures that are caused by multiple variables, or highly concurrent bugs (possibly with multiple re-executions). Embodiments of the present systems and methods may determine whether a failure is a sequential or concurrency failure via happens-before analysis. For concurrency failures, embodiments of the present systems and methods may further determine whether it is caused by race conditions or by other reasons. Although it can identify the statements (from different threads) causing the failure, it cannot tell whether a failure is an atomicity violation or order violation, which will be left to programmers to determine based on the program semantics.

Embodiments of the present systems and methods may provide a number of advantages. For example, methodologically, embodiments of the present systems and methods may provide the combination of the in-situ and identical re-execution and binary analysis to perform precise on-site failure diagnosis. By pushing the detection to user sites and employing the complete execution information supplied via identical re-executions, it overcomes the effectiveness problems of existing work caused by reliance on incomplete information. From an implementation perspective, embodiments of the present systems and methods may provide multiple practical techniques to simulate the behavior of programmers at user sites in order to precisely debug the failing applications. It employs debug registers to perform operations on behalf of programmers, and designs happens-before analysis to refine its root cause analysis. Embodiments of the present systems and methods may overcome challenges of overhead, privacy, transparency, and convenience in in-production failure analysis, making it suitable for deployment uses.

Embodiments of the present systems and methods may utilize an in-situ and identical record-and-replay system 104, such as iReplayer, that always replays the last epoch in the same process as the original execution. Although iReplayer is used as an example, embodiments of the present systems and methods may utilize any in-situ and identical record-and-replay system 104, including, for example, other existing systems and/or any newly developed in-situ and identical record-and-replay system.

System 104 may employ multiple mechanisms to reduce its recording overhead. For example, it may avoid recording memory accesses by handling race conditions in replay phases, as described below; it may avoid recording file reads/writes due to its in-situ setting; it may avoid recording memory allocations using a custom heap; it may efficiently record synchronizations and system calls using a novel data structure. System 104 may ensure a number of aspects. For example, Identical System States: system 104 may classify system calls into five categories: repeatable, recordable, revocable, deferrable, and irrevocable. System 104 may record the results of recordable system calls during the original execution, and may employ the recorded results during re-executions. For revocable system calls, for example, file reads/writes, system 104 may save the positions of all opened files, and may reproduce all read-/writes during the replay after recovering positions. System 104 may defer munmaps, closes, and thread exits, in order to preserve the same system states. System 104 may close the current epoch upon irrevocable system calls.

Identical Synchronizations: System 104 may support a range of common synchronization primitives, including thread creation, multiple forms of mutex locks, conditional variables, barriers, signals, and thread joins. During original executions, system 104 may record the order and results of synchronizations, and may reproduce the same order during replay. System 104 may introduce per-thread lists and per-variable lists to store syncs and syscall events, without using the global order. Each event may be initially recorded in its per-thread list, which may be added into the corresponding per-variable list for synchronizations. This design may be helpful for checking the divergence during re-executions: each thread is only required to check the next event of its per-thread list. If the actual event is not the same as the expected one, system 104 may immediately invoke a re-execution in order to search for a matching schedule. This implementation may also be helpful for root cause analysis, as described in below.

Identical Memory Uses: System 104 may support deterministic memory allocations and deallocations by designing a custom memory allocator. Its allocator adapts the per-thread heap organization so that memory allocations and deallocations of one thread will not interfere with those of another thread, which also avoids the use of locks. System 104 may further guarantee that per-thread heaps will interact with the outside world deterministically: (1) When the memory of a per-thread heap is exhausted, it will deterministically fetch a new block from the super heap. (2) Memory deallocations are all handled deterministically, where deallocated objects will be returned to the current thread issuing the free invocation.

Implementation: As described above, system 104 may perform lightweight recording and in-situ and identical replay. Embodiments of the present systems and methods may intercept failure signals to start failure diagnosis. Upon program failures, embodiments of the present systems and methods may be notified via the pre-registered signal handlers. For example, Linux always delivers the faulting signal to the failing thread by default, which allows embodiments of the present systems and methods to precisely determine the failing instruction. Since embodiments of the present systems and methods may require binary analysis in different steps, it decodes all instructions inside the application and libraries in the beginning. However, the XED2 library, for example, generates 196 bytes of information for each instruction, which may impose significant memory overhead. Instead, embodiments of the present systems and methods may create a block of memory to save only the instruction length and address for every instruction, and later decodes each instruction on-demand.

Context Analysis: Embodiments of the present systems and methods may handle failure signals and traps caused by accessing breakpoints and watchpoints. Inside the signal handler, the failing thread coordinates other threads to stop, which represents the failure points for different threads. These points also serve as stopping points for root cause analysis, since the failure must be caused by statements occurring prior to them. For failure signals, embodiments of the present systems and methods may mainly collect the calling context and instruction pointers. For traps, embodiments of the present systems and methods may collect more additional information, such as the value of an accessed memory location for watchpoints, and the position of each access inside per-thread lists. The value and position information will be employed to perform happens-before analysis, as further described below.

Identifying Branches for SIGABRT Failures. Most failures, except SIGABRT, do not require this step. Abort failures have a significant difference from other failures: the failure reason is not located in the same instruction as that raising the signal. SIGABRT can be raised in multiple situations. First, user programs or libraries may explicitly invoke the abort API to terminate a program, when detecting an error or unrecoverable issue. Second, compilers (for example, GCC) place a canary immediately prior to the return address on the stack, which may cause the SIGABRT signal to be raised if it is found to be corrupted. For stack smashing, the inserted handler will simply print "stack smashing detected" for GCC-compiled programs, without describing the root cause. Third, the assert macro, typically enabled in debugging mode, invokes the abort( ) function upon assertion failures. For these failures, there may exist multiple branches prior to the failure. Therefore, it is important to determine the branch leading to the failure, which serves as the starting point for root cause analysis, after which the actual failing instruction may be identified. Embodiments of the present systems and methods may use the combination of replay and breakpoints to determine the failing branch. Prior to replay, all instructions inside the current function may be decoded, and breakpoints may be place on all possible jump instructions (step 3). During re-executions, the traps caused by attempting to execute corresponding instructions related to these breakpoints may be handled. Upon each trap, the calling context of the current trapping instruction may be recorded. Then, the program may be instructed to proceed forward. If the abort subsequently occurs, then the last recorded trap instruction must be in the branch responsible for the abort. Binary analysis may be used to determine all near jumps inside the current function. It assumes that the abort is not caused by a far jump instruction, jumping into the middle of the program, if the program is not intentionally tampered with. The call stack of the failure may be utilized to determine the starting address of the current function, which is the target address of the calling instruction just before the second-to-last level of the call stack.

Identifying Failing Instructions/Registers. For failures caused by SIGABRT, after determining the failing branch, a backward search may be performed in order to identify the first instruction with comparison operations, which is the failing instruction leading to the abort. For other failures, the IP information may be utilized to directly identify the failing instruction. After that, the failing registers within each failing instruction may be determined. Segmentation faults are always caused by accessing an invalid address, thus the registers that contribute to the computation of the invalid address should be identified. More complicatedly, multiple registers may exist in the failing instruction for some failures, for example, the program aborts when x is less than y. During failure analysis, the assignments on both x and y's corresponding registers may be investigated. For such cases, the root cause of one failing register may be tracked before working on others.

Identifying Register Assignments. After determining the failing register, the corresponding address may be identified. Binary analysis may be performed to identify all instructions inside the current function that have the write property, and have a destination operand equaling to the failing register.

The failing register's value may come from other registers, a memory address, an immediate value, or an input parameter. Different actions may be taken for different situations. If the register value is only assigned from one input parameter, the caller may be inferred based on the calling context of the failure. The next level of the call stack may be entered into, and the same analysis may be performed for identifying failing addresses. For an extreme case, such as pbzip2, several levels of calling context may be analyzed in order to identify the failing address. If the register value is only assigned with the immediate value, then the failure identification may be stopped and happens-before analysis may be performed.

Figure 2:
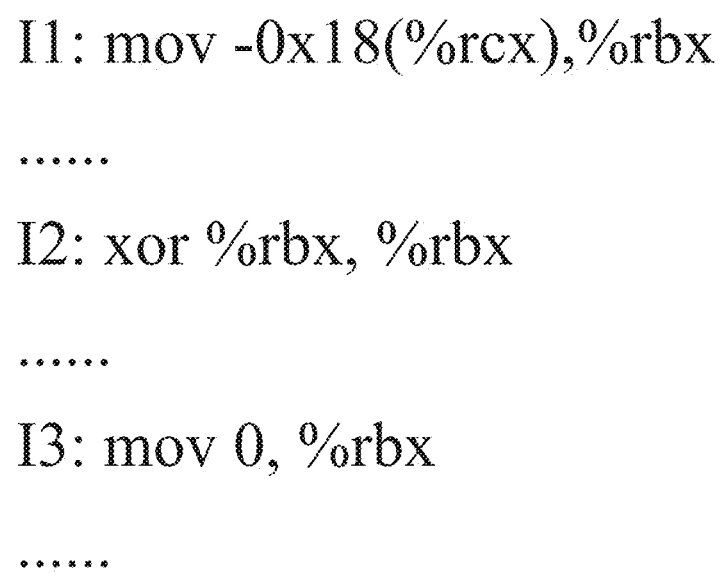

For other situations, the combination of replay and breakpoints may be employed to identify the situation. For example, as shown in the example of FIG. 2, there may be two methods of setting breakpoints. One method is to set them on the next instruction following I1, I2, and I3. However, this method cannot work if information-destroying instructions exist, for example, I3, since the instruction will destroy the original value of the rbx register. Therefore, breakpoints may actually be set on register assignment instructions, such as on I1, I2, and I3 for this example. During re-executions, the breakpoints may be fired before executing such instructions. Inside the trap handler, the values of all corresponding registers may be stored, such as rbp's value for the instruction I1. Then, when the failure occurs, the correct assignment instruction may be determined: the last assignment instruction prior to the failure will be the instruction that leads to failure, and should be the target.

Identifying Failing Addresses. After determining a specific register assignment, the corresponding memory addresses that lead to the failure may be determined. Typically, the corresponding value of registers may be saved upon each trap. Based on these saved register values, the failing address may be computed. For example, FIG. 3 shows a real assertion, with rdx being the failing register and the instruction aa6 being the register assignment. Breakpoints may be installed on the instruction aa6. Since the value of rbp register has been stored at instruction aa6, the memory address may be computed by subtracting 0x18 from the value of rbp register.

Happens-Before Analysis. After identifying failing memory addresses, hardware watchpoints may be installed at these locations in order to collect memory accesses during re-executions, which allows for identifying the root causes leading to the failure. Upon accesses, notification may occur via the preregistered trap handler. Inside the trap handler, the values from multiple threads may be collected. As described before, this collection also relies on the identical replay supported by an in-situ and identical record-and-replay system 104, such as iReplayer.

Figure 4:
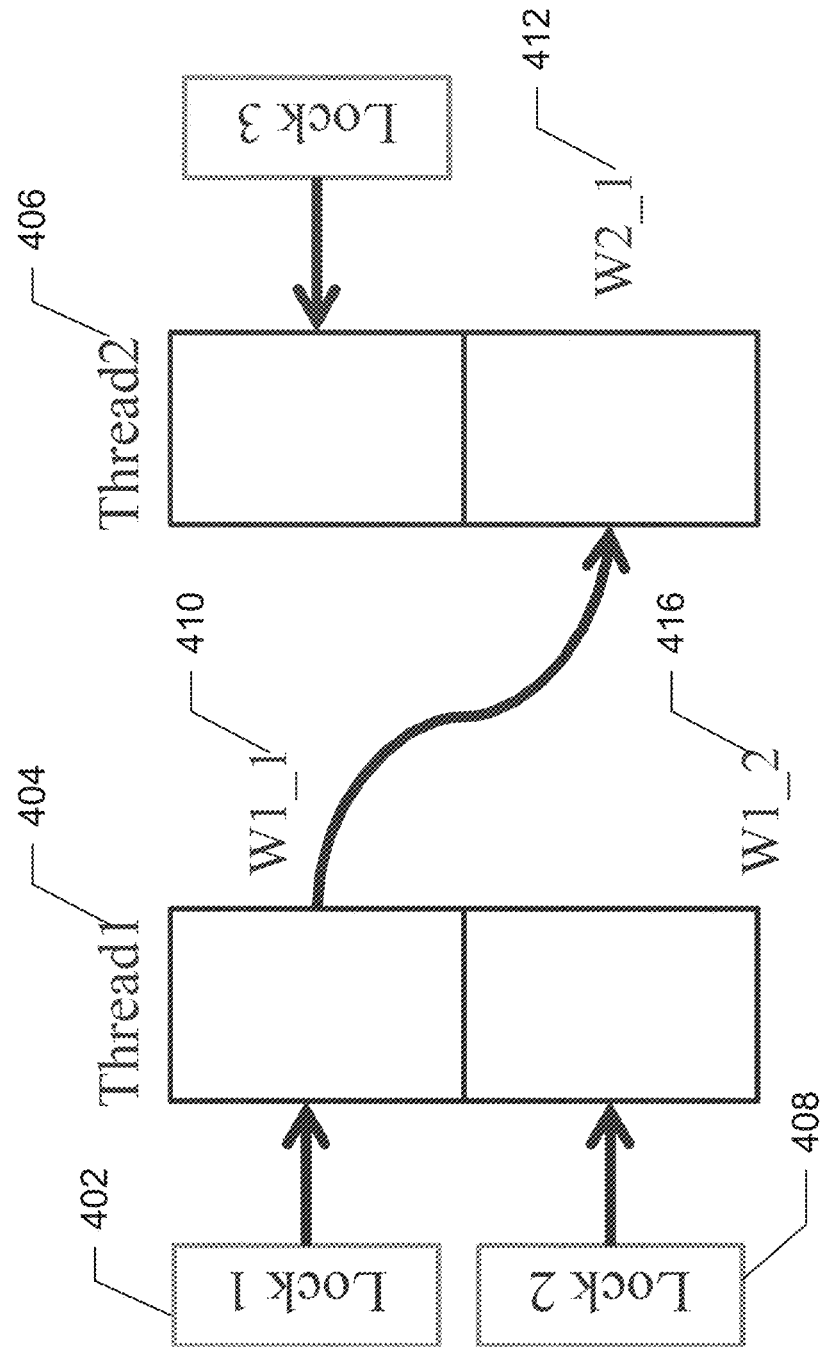
FIG. 4 illustrates an example of tracking the relative placement of each memory access by recording the position in per-thread lists.

As described above, watchpoints may be used in order to determine where the memory address was operated before this assignment. Since one memory address may be accessed by different threads numerous times, happens-before analysis may be performed to prune unnecessary accesses. To support this, the relative placement of each memory access may be tracked by recording the position in per-thread lists, as shown in the example in FIG. 4. Each synchronization event may first be added to its per-thread list, may be inserted into the corresponding per-synchronization-variable list.

In this example, lock1 402 was acquired by Thread1 404, and then by Thread2 406, and lock2 408 was first acquired by Thread1 404. The locks held by each thread may be continuously tracked, which allows further differentiation of whether a memory access occurs within the protection of locks, or is unprotected. In the example shown in FIG. 4, memory references occurring under lock protection, such as W1_1 410 and W2_1 412, may be placed within the synchronization event, while the memory references outside all locks, such as W1_2 416, may be placed between events. The happens-before relationship between each memory access may be inferred by employing, for example, the data structure shown in FIG. 4. If there are multiple memory references inside a thread, then the latest one will overwrite previous ones. In the example shown in FIG. 4, the reference W1_2 416 overwrites the reference W1_1 410, and W1_1 410 will be discarded during the recording. The same lock can indicate the happens-before relationship between different threads. In the example shown in FIG. 4, W1_1 410 happens before W2_1 412. Based on the happens-before relationship, all unnecessary memory references may be pruned in order to simplify root cause analysis. The order of other synchronizations may be recorded to assist the analysis, such as barriers or thread creations and joins.

Root Cause Analysis and Report. After performing happens-before analysis, the following steps may be performed: (1) it may be determined whether the failure is a sequential or concurrency failure. (2) For concurrency bugs, the actual type of concurrency bug may be further identified, for example, whether race conditions exist. (3) It may further be determined whether further diagnosis is to be performed. (4) The output may be assembled and generated. To determine a sequential failure, processing may start from the failing thread, and may confirm whether the value of the failing address is last written by the current thread. If so, then it may be determined that the failure is a sequential failure. Otherwise, it is a concurrency failure. Then further checks may be performed to determine whether the last write from another thread and the failing reference are protected by the same lock. If not, the failure may be reported as a race condition. Otherwise, this may be caused by atomicity violation, order violation, or other reasons. Programmers may determine the real type of the failure, since the semantics may not be known and the differential schedule may not be utilized to determine it. Instead, only the statements leading to the failure may be reported. Then the system can determine whether or not to stop the diagnosis. If the system is configured to be one-level analysis, or there are no more memory accesses that are detected, the failure diagnosis may be stopped immediately. Otherwise, the placement of different threads may be tracked, and then it may be determined to perform more diagnosis. If the corresponding instruction includes the register assignment, the processing may go to step 4 again. Otherwise, the processing goes directly to step 6. Root causes of software crashes may be reported, for example, on the screen, with detailed calling contexts provided. Based on the pre-set value, the root cause chain of failures may be reported, which may help in understanding the roadmap of software failures. In embodiments, a report may be sent via email, given the permission of users.

Evaluation. In an exemplary evaluation of the present techniques, experiments were performed on a two-socket Intel(R) Xeon(R) CPU E5-2640 processors, each with 8 cores. The machine was installed with 256 GB main memory, and 256 KB L1, 2 MB L2 and 20 MB L3 cache separately. The underlying OS was Ubuntu 16.04, installed with Linux-4.4.25 kernel, GCC-4.9.1, with -O2 and -g flags, was used to compile all applications and libraries.

Effectiveness. The effectiveness of embodiments of the present systems and methods was determined utilizing 20 real world programs with 23 known sequential and concurrency bugs, as shown in FIG. 5. In this example, the bugs included segfaults, divide-by-zero, assertion, and abort failures. Embodiments of the present systems and methods may be applied to other types of bugs, such as floating point failures or even no-stop failures, such as program hangs. In embodiments, the present systems and methods may be configured to perform one level and/or multi-level root cause diagnosis. For one-level analysis, only the most recent statements that directly cause the failure were considered as the root cause, which is the same as thin slicing.

However, some failures are much more complicated, as described below. For example, when a program crashes due to accessing one field of object A, such as A→ptr, but A→ptr was copied from another object B, a crash may occur. When the multi-level diagnosis is enabled, the fault propagation chain inside the current epoch may be collected, providing abundant information to assist bug fixes.

Overhead of Failure Diagnosis. FIG. 5 shows the overhead of failure diagnosis. These applications typically crash very soon after starting, with typically less than 2 seconds of execution time, due to the use of buggy inputs. After crashes, automatic failure diagnosis may be performed. For one-level failure diagnosis, the median, average, and maximum analysis time found in these exemplary experiments was 0.616, 1.8, and 8.2 seconds.

Multi-level diagnosis generally takes more time to finish, since the fault propagation chain inside the current epoch must be collected. Thus, the median, average, and maximum analysis time was 0.96, 2.4, and 10.5 seconds. Note that if the original length of an epoch is longer, more time may be taken to perform failure analysis. These results indicate that embodiments of the present systems and methods may quickly diagnosis failures.

As shown in FIG. 5, the median, average, and maximum number of replays required was 4 times, 8.4 times, and 50 times for one-level failure diagnosis, while multilevel diagnosis typically requires more replays. However, if a register has been assigned an immediate value, such as in "MOV AX, 0xF00F", then there is no need to perform further diagnosis on this register. This explains why multi-level diagnosis sometimes utilizes the same number of replays as one-level diagnosis. Multiple replays may be required for some bugs, such as Memcached. This behavior may be due to the following reasons: (1) some bugs may involve multiple branches (for example, aborts) or multiple variables (for example, multivariable failures). (2) One failing address can be affected by multiple registers on each level. Recursively, it may require multiple replays to identify multi-level root causes. (3) When tracking of multiple registers is needed, diagnosis of one register may be finished before tracking others.

Case Studies. In this section, three exemplary case studies show how embodiments of the present systems and methods may help programmers by assisting their bug fixes.

Multi-Level Root Cause: FIG. 6 shows an example of the Memcached bug, a complicated bug that requires multilevel failure diagnosis. Memcached crashes inside the memmove function, as shown in line L4, which actually interprets a negative parameter as an "unsigned" value (the third parameter of the memmove function). Inside the signal handler, first the instruction that accesses an invalid memory address, for example, "movps -0x20(%rcx), %xmm2", may first be identified and then tracing of the assignments of rcx register may be started. In this example, nine such instructions may be identified in the current function. Breakpoints may be placed on these instructions, and multiple replays may be utilized to determine which one is the last assignment before the crash.

The relevant instruction is found to be "lea -0x10(%rsi, %rdx, 1), %rcx", which is related to line L4: rdx is the third parameter (tocopy), and rsi is the second parameter (c→r-crr). From this point, the origin of these two registers may be tracked. The rdx register, relating to the tocopy parameter, is actually assigned in statement L3. After obtaining the address of the tocopy variable, a watchpoint may be installed here, and all memory accesses tracked on it during replays. Finally, it is confirmed that statement L2 performs a write operation on this address, which is the last assignment to it, using the root cause analysis as described in above. This is the first level of root cause, which employs the watchpoint once. In fact, in this instruction, vlen is a negative value, which causes memmove to touch an invalid address.

If the system is configured to collect one-level root causes, at this point processing may stop. Otherwise, the fault propagation chain may be continued to be traced, until there are no other memory accesses to trace in the current epoch.

Assertion Caused by Concurrency Failure: FIG. 7 illustrates an assertion failure in L8. Three threads are involved in this bug. A producer thread calls pqueue_put to write the data to a shared queue, with the qp->occupied being updated to be 1. After that, two consumer threads may invoke pqueue get to fetch the data simultaneously, since the critical section is broken into two parts (as L6 and L7). Then the second consumer thread will detect that the qp->occupied is equal to 0, which leads to an assertion violation caused by atomicity violation.

The SIGABRT signal may be caught because the assert macro finally invokes abort. Then all branch instructions in the current function may be identified, and breakpoints may be placed on each jump instruction. During replays, the causal branch that is affected by the comparison operation may be identified, which is "test ecx, ecx" instruction inside. Therefore, the origin of the ecx register may be tracked. As long as the memory address of qp->occupied is found, a watchpoint is installed at that location to collect data flow. Assuming a given schedule with T0{L1;L2;L3};T1{L4;L5; L6}; T2{L4;L5;L6;L7;L8;L9};T1{L7;L8}, both T0 and T2 write 1 and 0 to qp->occupied respectively. Happen-before analysis may be performed based on recorded events. According to the aforementioned scheduling, T0 obtains lock qp->mtx first, and T2 acquires it later. Thus, there is a happens-before relationship between T0 and T2 on this memory unit. Therefore, T0 does not contribute to the failure, which will be pruned for the diagnosis. By identifying the accesses from T1 and T2, it may be inferred that T2 occurs before T1 on this address, since L8 and L9 are under the same lock, qp->mtx. However, the process cannot know program semantics; it can only report it why the assertion will fail. This is the first level root cause. After that, another level of root cause from L9 is tracked, which is in the initialization function where qp->occupied is initialized to 0. Tracking may then stop, since the memory is assigned to an immediate value.

Stack Overflows Invoking Abort: An example of a stack buffer overflow bug in the tcp test function of Aireplay-ng is shown in FIG. 8. For this bug, the socket reads may overwrite the local buffer packet (at line L3), which is declared to be 1024 bytes at L1. As described before, the GCC compiler invokes abort to report such failure, but does not report root cause, or even the function name associated with the stack smashing. In contrast, embodiments of the present systems and methods may report the exact root cause for this type of failure, by indicating the relevant statements.

For this example, the SIGABRT signal may be handled such that it knows the failure is caused by invoking the abort( ) function. For aborts/assertions, the failing branch may be determined, since typically there are multiple branches before the invocation of abort( ). As such, there are 34 branch instructions in the current function. Thus, breakpoints may be placed on each, and multiple replays may be employed to confirm the failing branch, which should be the last branch prior to the failure. In the end, the branch is found to be a JNE instruction. Then, in reverse, all instructions in the current basic block may be checked one-by-one, and the XOR may be identified as the failing instruction, which is used to compare the register value with a magic word. Further, the register assignment may be determined using the same procedure of using breakpoints. After identifying the register, the address of this variable may be collected during replay, and the watchpoint may be installed on the stack address that contains the corrupted canary. By handling the traps, it may be determined that statement L4 is the last write on this canary, which is the root cause for this bug. Since this statement is a read system call, and the bug is a stack overflow, another level may be traced.

Note embodiments of the present systems and methods may surpass the static binary analysis approach for this failure. For example, the read system call may block static analysis completely, since the dynamic information about the size of data chunks and the memory address may not be available. This issue may be avoided by pushing the binary analysis to the user site.

Performance Overhead. As described above, embodiments of the present systems and methods may employ an existing work—iReplayer—to perform in-situ and identical record-and-replay. Therefore, such embodiments may inherit the overhead of iReplayer. In the following examples, the performance overhead may be evaluated for common cases that applications do not have explicit failures. The performance was evaluated using the popular PARSEC benchmark suite, and multiple widely-utilized real applications, such as Apache, Memcached, aget, pbzip2, and pfscan. In total, there are 16 multithreaded applications in this example.

Figure 10:
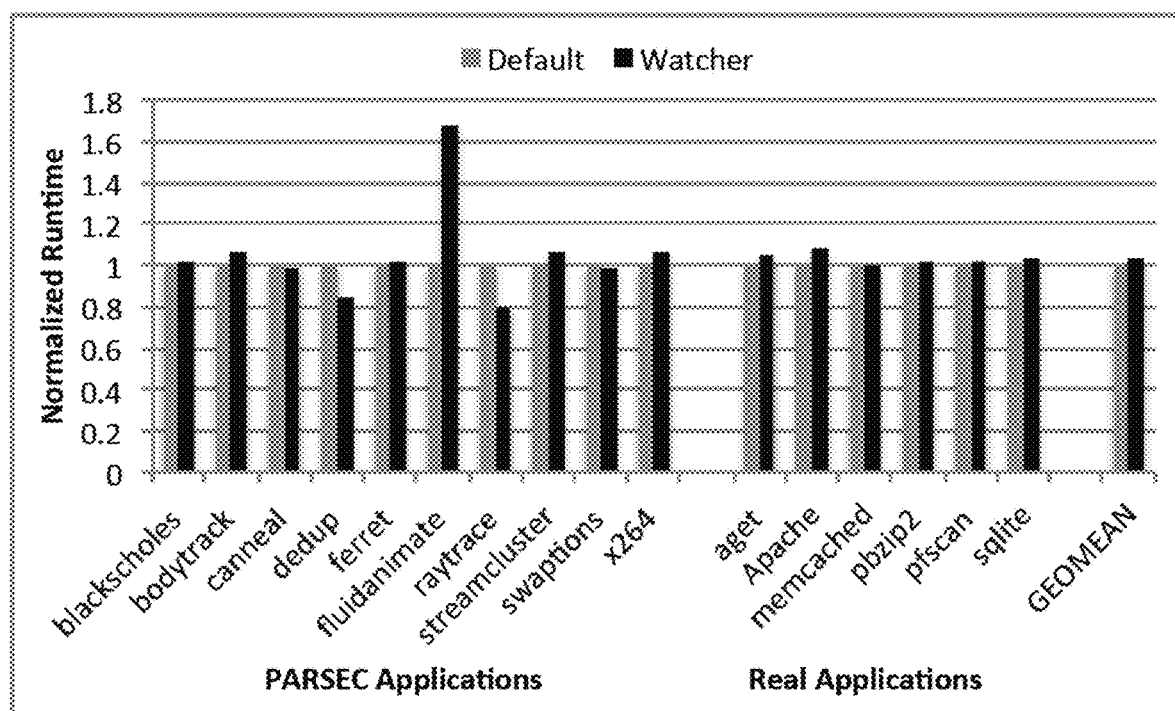
FIG. 10 illustrates an exemplary results of an experiment to determine performance overhead of embodiments of the present systems and methods.

Examples of the performance overhead of embodiments of the present systems and methods can be seen in FIG. 10. For comparison purposes, the performance of "Default" and "Watcher" are listed in the same figure, where "Default" represents the performance overhead when using the default libraries on the Linux machine. The figure shows the normalized runtime for different applications. That is, if the bar is higher than 1.0, this indicates that the corresponding application runs slower than with the Linux default pthreads library. In total, embodiments of the present systems and methods imposes around 3% performance overhead, which makes it suitable for being employed in in-production mode software.

For some applications, such as raytrace and dedup, embodiments of the present systems and methods run faster than the default. To investigate the internal reasons behind this, the performance data for the memory allocator was inspected, although this is not shown in the figure. These results show that the memory allocator (actually iReplayer's allocator) boosts performance by around 2% overall, and also contributes to the performance improvement of these two applications. The memory allocator always returns the deallocated objects to the current thread, which avoids the usage of locks and boosts performance. The default memory allocator invokes a large number of unnecessary madvise system calls for dedup, which also contributes to the performance difference.

We also observed that embodiments of the present systems and methods introduce less than 7% runtime overhead for most applications, except for fluidanimate. Data was collected on the number of epochs, synchronizations, and system calls, as shown in FIG. 9. If an application contains multiple epochs, or a large number of synchronizations or system calls, this can significantly increase its runtime overhead. As described above, in the beginning of each epoch, embodiments of the present systems and methods (actually iReplayer) should take a snapshot of the memory state, by copying out all writable memory. For each synchronization and system call, the process should check whether it is time to stop the current epoch and record the corresponding events. The extreme case is fluidanimate, which acquires 1.7 billion locks during an execution lasting around 30 seconds. Therefore, the checking and recording overhead is intensively large for this application.

FIG. 9 also shows the epoch length and possible recording overhead for embodiments of the present systems and methods. The epoch length varies between 0.16 and 59.50 seconds, with an average of 21.01 seconds. As acknowledged above, embodiments of the present systems and methods may only diagnose root causes located within the last epoch. With an epoch length of dozens of seconds, most software failures may actually be diagnosed. The recording overhead shown in FIG. 9 does not represent real overhead, but is a computed result based on the number of synchronizations and system calls. The data show that embodiments of the present systems and methods actually imposes less than 125 megabytes of overhead for almost all applications except fluidanimate. As can be seen in the figure, fluidanimate is an extreme case that imposes a notoriously large number of synchronizations, which should not be representative of real applications.

Limitations. Embodiments of the present systems and methods that use iReplayer may inherit some limitations from iReplayer. (1) iReplayer only replays the last epoch in order to reduce recording overhead, which implies that the root causes of some failures theoretically may not be identified if the root cause exists in a different epoch. In embodiments, an average epoch duration is more than 21 seconds, which greatly reduces such possibilities. Further, many bugs have a very short distance of error propagation, which indicates that the root cause may be located shortly prior to a failure. (2) Applications with self-defined synchronizations may not be supported, since iReplayer cannot identically reproduce such applications. To overcome these issues, some explicit instrumentation, may be used. For applications with race conditions, multiple re-executions may be needed to identify the root cause, which may increase the analysis time. However, as shown in the example of FIG. 5, the average analysis time is around 2.4 seconds, while the longest is only around 10 seconds.

Note that embodiments of the present systems and methods may support program hangs, with some additional extensions. Further, embodiments of the present systems and methods should be easily extendable to a variety of processor architectures, such as those with RISC instruction sets.

Figure 11:
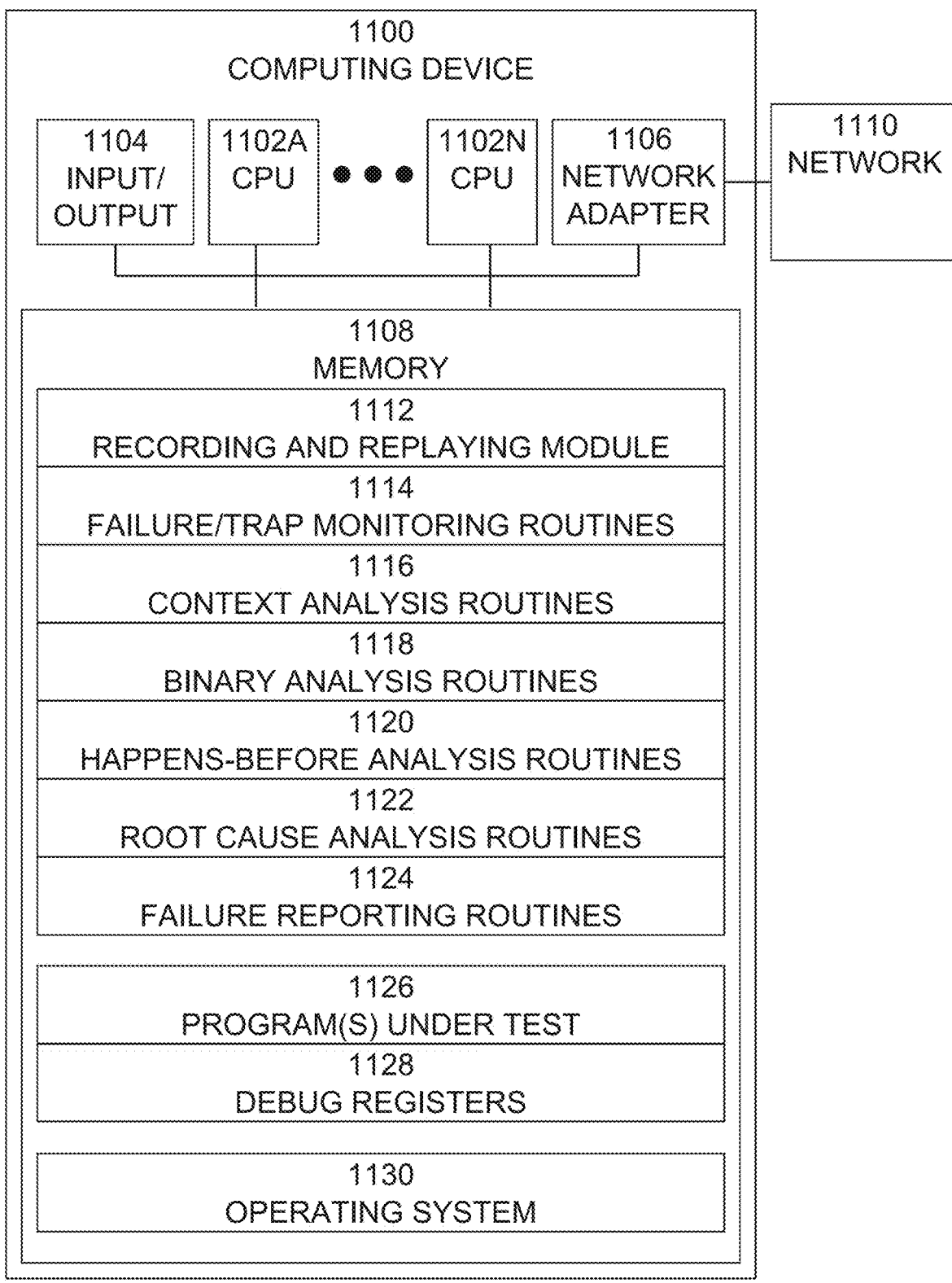
FIG. 11 illustrates an example of a computer system in which embodiments of the present systems and methods may be implemented.

An exemplary block diagram of a computer system 1100, in which entities and processes involved in the embodiments described herein may be implemented, is shown in FIG. 11. Computer system 1100 may typically be implemented using one or more programmed general-purpose computer systems, such as embedded processors, systems on a chip, personal computers, workstations, server systems, and minicomputers or mainframe computers, or in distributed, networked computing environments. Computer system 1100 may include one or more processors (CPUs) 1102A-1102N, input/output circuitry 1104, network adapter 1106, and memory 1108. CPUs 1102A-1102N execute program instructions in order to carry out the functions of the present communications systems and methods. Typically, CPUs 1102A-1102N are one or more microprocessors, such as an INTEL CORE® processor.

FIG. 11 illustrates an embodiment in which computer system 1100 is implemented as a single multi-processor computer system, in which multiple processors 1102A-1102N share system resources, such as memory 1108, input/output circuitry 1104, and network adapter 1106. However, the present communications systems and methods also include embodiments in which computer system 1100 is implemented as a plurality of networked computer systems, which may be single-processor computer systems, multi-processor computer systems, or a mix thereof.

Input/output circuitry 1104 provides the capability to input data to, or output data from, computer system 1100. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 1106 interfaces device 1100 with a network 1110. Network 1110 may be any public or proprietary LAN or WAN, including, but not limited to the Internet.

Memory 1108 stores program instructions that are executed by, and data that are used and processed by, CPU 1102 to perform the functions of computer system 1100. Memory 1108 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 1108 may vary depending upon the function that computer system 1100 is programmed to perform. In the example shown in FIG. 11, exemplary memory contents are shown representing routines and data for embodiments of the processes described above. However, one of skill in the art would recognize that these routines, along with the memory contents related to those routines, may not be included on one system or device, but rather distributed among a plurality of systems or devices, based on well-known engineering considerations. The present communications systems and methods may include any and all such arrangements.

In the example shown in FIG. 11, memory 1108 may include recording and replaying module 1112, failure/trap monitoring routines 1114, context analysis routines 1116, binary analysis routines 1118, happens-before analysis routines 1120, root cause analysis routines 1122 failure reporting routines 1124, program(s) under test 1126, debug registers 1128, and operating system 1130. Recording and replaying module 1112 may include software routines to perform recording of information relating to the execution of program(s) under test 1124, as well as a replay function 108 that may provide in-situ and identical replay of the execution of program(s) under test 1124, as described above. Failure/trap monitoring routines 1114 may include software routines to intercept different failure signals, as described above. Context analysis routines 1116 may include software routines to identify the failing call stack and instruction pointer (IP), as described above. Binary analysis routines 1118 may include software routines to identify all possible branches, to place breakpoints on the corresponding jump instructions, and to determine the failing branch during replays, as described above. Happens-before analysis routines 1120 may include software routines to determine which access occurred before other accesses, as described above. Root cause analysis routines 1122 may include software routines to extract important information for reporting, as described above. Failure reporting routines 1124 may include software routines to generate failure reports, as described above. Program(s) under test 1124 may include software programs, packages, routines, etc. that are to be analyzed by the present systems and method, as described above. Detection data 1118 may include data relating to detected performance issues that was generated by detection routines 1112 as described above. Diagnosis data 1120 may include data relating to diagnosed performance issues that was generated by diagnosis routines 1114 as described above. Debug registers 1128 may include memory locations and logic to implement breakpoints and watchpoints, as described above. Operating system 1122 may provide overall system functionalities.

As shown in FIG. 11, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it.

Many operating systems, including Linux, UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. Thus, it is impossible for any program to damage the execution of any of the other programs running on the system. However, the programs have no way to exchange any information except through the operating system (or by reading files stored on the file system).

Multi-process computing is similar to multi-tasking computing, as the terms task and process are often used interchangeably, although some operating systems make a distinction between the two. The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function (s).

In some alternative implementations, the functions noted in the blocks may occur out of the order noted in the Figures. For example, two blocks shown in succession may, in fact, be executed substantially concurrently, or in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or that carry out combinations of special purpose hardware and computer instructions. Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

From the above description, it can be seen that the present invention provides a system, computer program product, and method for the efficient execution of the described techniques. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

While the foregoing written description of the invention enables one of ordinary skill to make and use what is considered presently to be the best mode thereof, those of ordinary skill will understand and appreciate the existence of alternatives, adaptations, variations, combinations, and equivalents of the specific embodiment, method, and examples herein. Those skilled in the art will appreciate that the within disclosures are exemplary only and that various modifications may be made within the scope of the present invention. In addition, while a particular feature of the teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the teachings will be apparent to those skilled in the art from consideration of the specification and practice of the teachings disclosed herein. The invention should therefore not be limited by the described embodiment, method, and examples, but by all embodiments and methods within the scope and spirit of the invention. Accordingly, the present invention is not limited to the specific embodiments as illustrated herein, but is only limited by the following claims.

What is claimed is:

1. A method implemented in a computer system comprising a processor, memory accessible by the processor and adapted to store program instructions, and the program instructions stored in the memory and executable by the processor, the method comprising:
    recording, at the computer system, information relating to execution of software code;
    intercepting, at the computer system, a failure signal indicating a failure detected in the execution of the software code;
    identifying, at the computer system, a failing register and an instruction pointer associated with the failure signal to determine a location of the failure in the software code;
    identifying, at the computer system, all possible branches of execution at the location of the failure in the software code and placing breakpoints on corresponding jump instructions to determine a failing branch;
    replaying the execution of the software code based on the recorded information;
    determining, at the computer system, the failing register using a failing instruction pointed to by the instruction pointer;
    determining, at the computer system, using the breakpoints, a last assignment to the failing register before the failure;
    if at the breakpoints during the replay of the execution of the software code a value of the last assignment associated with the failing register is determined to come from an additional register, setting an additional breakpoint and replaying the execution of the software code based on the recorded information and the additional breakpoint; and
    if at the breakpoints during the replay of the execution of the software code the value of the last assignment associated with the failing register is determined not to come from the additional register, generating, at the computer system, a failure report indicating the failing register and the failing instruction as a root cause of the failure detected in the execution of the software code.

2. The method of claim 1, further comprising:
    if the value of the last assignment associated with the failing register originates from a memory address, then computing, at the computer system, a failing memory address based on a value in the failing register after the last assignment;
    installing, at the computer system, a watchpoint on the failing memory address; and
    tracing, at the computer system, potential instructions that attempt to access the failing memory address using the watchpoint by replaying the execution of the software code based on the recorded information and the watchpoint; and
    after determining that a first plurality of memory accesses occurred before at least one second memory access, pruning, at the computer system, the plurality of memory accesses that cannot be part of the root cause of the failure in the execution of the software code.

3. The method of claim 2, wherein generating the failure report comprises:
    if the value of the failing memory address is last written by a first thread, then identifying the failure as a sequential failure;
    if the failure is not a sequential failure, then identifying the failure as a concurrency failure;
        if the failure is a concurrency failure and a last write from a second thread and the failing memory address are protected by a lock, then further identifying the concurrency failure as a race condition;
        if the failure is a concurrency failure but not a race condition, then further identifying the concurrency failure as due to another condition; and
    reporting a type of failure in the software code and a location of the failure in the software code to a user.

4. The method of claim 3, wherein generating the failure report further comprises:
    if the method is configured to diagnose more than one level or there are more memory accesses that are detected, continuing the determination of the root cause of the failure;
    if the method is only configured to diagnose a single level or there are no more memory accesses that are detected, stopping the determination of the root cause of the failure;
    reporting the root cause of the failure in the software code to the user.

5. The method of claim 1, further comprising:
    if the value of the last assignment associated with the failing register originates from one of the following: a memory address, an immediate value, or an input parameter; or
    if the failure diagnosis reaches a beginning of a last epoch;

then reporting the origin of the value of the last assignment associated with the failing register and reporting that the failure diagnosis has reached the beginning of the last epoch.

6. A system comprising:
a processor, memory accessible by the processor and adapted to store program instructions, and the program instructions stored in the memory and executable by the processor to perform:
recording information relating to execution of software code;
intercepting a failure signal indicating a failure detected in the execution of the software code;
identifying a failing register and an instruction pointer associated with the failure signal to determine a location of the failure in the software code;
identifying all possible branches of execution at the location of the failure in the software code and placing breakpoints on corresponding jump instructions to determine a failing branch;
replaying the execution of the software code based on the recorded information;
determining the failing register using a failing instruction pointed to by the instruction pointer;
determining, using the breakpoints, a last assignment to the failing register before the failure;
if at the breakpoints during the replay of the execution of the software code a value of the last assignment associated with the failing register is determined to come from an additional register, setting an additional breakpoint and replaying the execution of the software code based on the recorded information and the additional breakpoint; and
if at the breakpoints during the replay of the execution of the software code the value of the last assignment associated with the failing register is determined not to come from the additional register, generating a failure report indicating the failing register and the failing instruction as a root cause of the failure detected in the execution of the software code.

7. The system of claim 6, the processor further to perform:
if the value of the last assignment associated with the failing register originates from a memory address, then computing a failing memory address based on a value in the failing register after the last assignment;
installing a watchpoint on the failing memory address; and
tracing potential instructions that attempt to access the failing memory address using the watchpoint by replaying the execution of the software code based on the recorded information and the watchpoint; and
after determining that a first plurality of memory accesses occurred before at least one second memory access, pruning the plurality of memory accesses that cannot be part of the root cause of the failure in the execution of the software code.

8. The system of claim 7, wherein generating the failure report comprises:
if the value of the failing memory address is last written by a first thread, then identifying the failure as a sequential failure;
if the failure is not a sequential failure, then identifying the failure as a concurrency failure;
if the failure is a concurrency failure and a last write from a second thread and the failing memory address are protected by a lock, then further identifying the concurrency failure as a race condition;
if the failure is a concurrency failure but not a race condition, then further identifying the concurrency failure as due to another condition; and
reporting a type of failure in the software code and a location of the failure in the software code to a user.

9. The system of claim 8, wherein generating the failure report further comprises:
if the method is configured to diagnose more than one level or there are more memory accesses that are detected, continuing the determination of the root cause of the failure;
if the method is only configured to diagnose a single level or there are no more memory accesses that are detected, stopping the determination of the root cause of the failure;
reporting the root cause of the failure in the software code to the user.

10. The system of claim 6, the processor further to perform:
if the value of the last assignment associated with the failing register originates from one of the following: a memory address, an immediate value, or an input parameter; or
if the failure diagnosis reaches a beginning of a last epoch;
then reporting the origin of the value of the last assignment associated with the failing register and reporting that the failure diagnosis has reached the beginning of the last epoch.

11. A computer program product comprising a non-transitory computer readable storage having program instructions embodied therewith, the program instructions executable by a computer system, to cause the computer system to perform a method comprising:
recording, at the computer system, information relating to execution of software code;
intercepting, at the computer system, a failure signal indicating a failure detected in the execution of the software code;
identifying, at the computer system, a failing register and an instruction pointer associated with the failure signal to determine a location of the failure in the software code;
identifying, at the computer system, all possible branches of execution at the location of the failure in the software code and placing breakpoints on corresponding jump instructions to determine a failing branch;
replaying the execution of the software code based on the recorded information;
determining, at the computer system, the failing register using a failing instruction pointed to by the instruction pointer;
determining, at the computer system, using the breakpoints, a last assignment to the failing register before the failure;
if at the breakpoints during the replay of the execution of the software code a value of the last assignment associated with the failing register is determined to come from an additional register, setting an additional breakpoint and replaying the execution of the software code, based on the recorded information and the additional breakpoint; and
if at the breakpoints during the replay of the execution of the software code the value of the last assignment associated with the failing register is determined not to come from the additional register, generating, at the computer system, a failure report indicating the failing register and the failing instruction as a root cause of the failure detected in the execution of the software code.

12. The computer program product of claim 11, wherein the method further comprising:

if the value of the last assignment associated with the failing register originates from a memory address, then computing, at the computer system, a failing memory address based on a value in the failing register after the last assignment;

installing, at the computer system, a watchpoint on the failing memory address; and tracing, at the computer system, potential instructions that attempt to access the failing memory address using the watchpoint by replaying the execution of the software code based on the recorded information and the watchpoint; and after determining that a first plurality of memory accesses occurred before at least one second memory access, pruning, at the computer system, the plurality of memory accesses that cannot be part of the root cause of the failure in the execution of the software code.

13. The computer program product of claim 12, wherein generating the failure report comprises:

if the value of the failing memory address is last written by a first thread, then identifying the failure as a sequential failure;

if the failure is not a sequential failure, then identifying the failure as a concurrency failure;

if the failure is a concurrency failure and a last write from a second thread and the failing memory address are protected by a lock, then further identifying the concurrency failure as a race condition;

if the failure is a concurrency failure but not a race condition, then further identifying the concurrency failure as due to another condition; and reporting a type of failure in the software code and a location of the failure in the software code to a user.

14. The computer program product of claim 13, wherein generating the failure report further comprises:

if the method is configured to diagnose more than one level or there are more memory accesses that are detected, continuing the determination of the root cause of the failure;

if the method is only configured to diagnose a single level or there are no more memory accesses that are detected, stopping the determination of the root cause of the failure;

reporting the root cause of the failure in the software code to the user.

15. The computer program product of claim 11, wherein the method further comprising:

if the value of the last assignment associated with the failing register originates from one of the following: a memory address, an immediate value, or an input parameter; or if the failure diagnosis reaches a beginning of a last epoch;

then reporting the origin of the value of the last assignment associated with the failing register and reporting that the failure diagnosis has reached the beginning of the last epoch.

* * * * *